United States Patent [19]  
Bernstein et al.

[11] 3,914,294  
[45] Oct. 21, 1975

[54] 3,5-DISUBSTITUTED-2,4,6-TRIIODOBENZOIC ACIDS

[75] Inventors: Jack Bernstein, New Brunswick; Francis Alexander Sowinski, Edison, both of N.J.

[73] Assignee: E. R. Squibb & Sons, Inc., Princeton, N.J.

[22] Filed: June 1, 1972

[21] Appl. No.: 258,557

[52] U.S. Cl. ............... 260/519; 260/471 R; 424/5
[51] Int. Cl. ......................................... C07c 101/72
[58] Field of Search ............ 260/519; 424/5, 471 R

[56] References Cited
UNITED STATES PATENTS

| | | | |
|---|---|---|---|
| 2,939,881 | 6/1960 | Wiegert | 260/519 |
| 3,119,858 | 1/1964 | Larsen | 260/518 A |
| 3,145,197 | 8/1964 | Hoey | 260/518 A |
| 3,210,412 | 10/1965 | Chapman | 260/519 |
| 3,622,616 | 11/1971 | Guerbet et al. | 260/519 |
| 3,666,800 | 5/1972 | Bernstein et al. | 260/518 A |
| 3,701,771 | 10/1972 | Almen et al. | 260/211 R |

OTHER PUBLICATIONS

Hoey et al., Journal of Medicinal Chemistry, Vol. 6, (1963), pp. 24–26.

*Primary Examiner*—Lorraine A. Weinberger
*Assistant Examiner*—Patrick J. Hagan
*Attorney, Agent, or Firm*—Lawrence S. Levinson; Merle J. Smith; Stephen B. Davis

[57] ABSTRACT

3,5-Disubstituted-2,4,6-triiodobenzoic acids and derivatives thereof and their methods of preparation are disclosed. In addition, useful compositions containing said compounds and their methods of use are reported.

3 Claims, No Drawings

3,914,294

3,5-DISUBSTITUTED-2,4,6-TRIIODOBENZOIC ACIDS

BACKGROUND OF THE INVENTION

Considerable effort has been expended by researchers to produce radiopaque substances for use as diagnostic agents. These efforts have met with a certain degree of success. However, radiologists desire still better compounds having more desirable properties, such as higher iodine content to enable detection at lower concentrations, lower orders of toxicity and higher orders of stability, while industry adds the following requirements, ease of preparation and inexpensive materials. Thus the search for improved agents is a continuing one.

SUMMARY OF THE INVENTION

This invention relates to new radiopaque compounds of the general formulae:

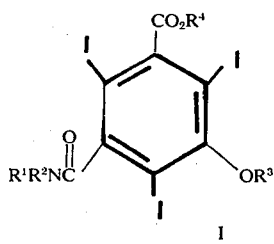

I and

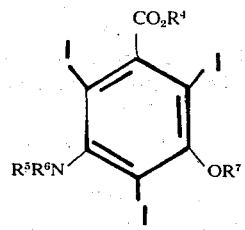

II wherein $R^1$ to $R^5$ are hydrogen, alkyl, 2-hydroxyalkyl or 2,3-dihydroxyalkyl; $R^6$ is hydrogen, acyl, alkylsulfonyl, ureido, N-alkylureido or carboalkoxy; $R^7$ is alkyl, 2-hydroxyalkyl and 2,3-dihydroxyalkyl, and when $R^6$ is hydrogen, the pharmaceutically acceptable salts of the amino group such as the hydrochloride, citrate, acetate, etc. In addition, when $R^4$ is hydrogen, this invention encompasses the pharmaceutically acceptable salts of said carboxylic acids, such as the sodium, potassium, ammonium, N-methylglucamine, diethanolamine, etc. In formula II, one prepares either a salt of the acid or the amine salt, but naturally not both simultaneously.

In addition, procedures for preparing and compositions containing said compounds and methods for administering said compositions are also encompassed by the invention.

The compounds of this invention may be prepared by the following reaction routes:

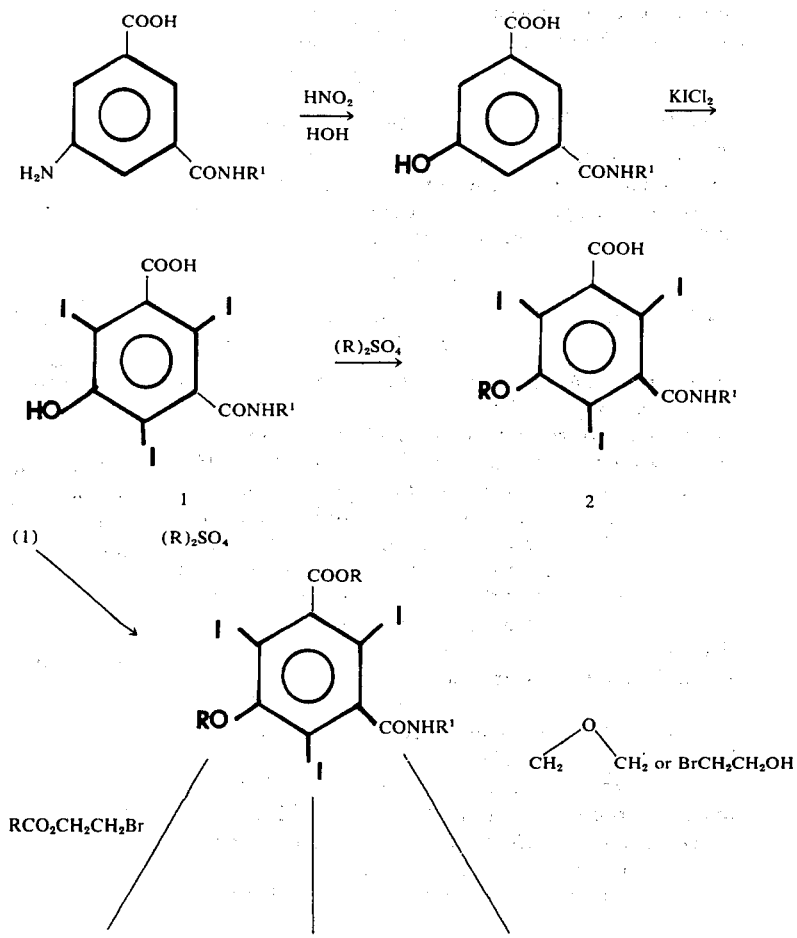

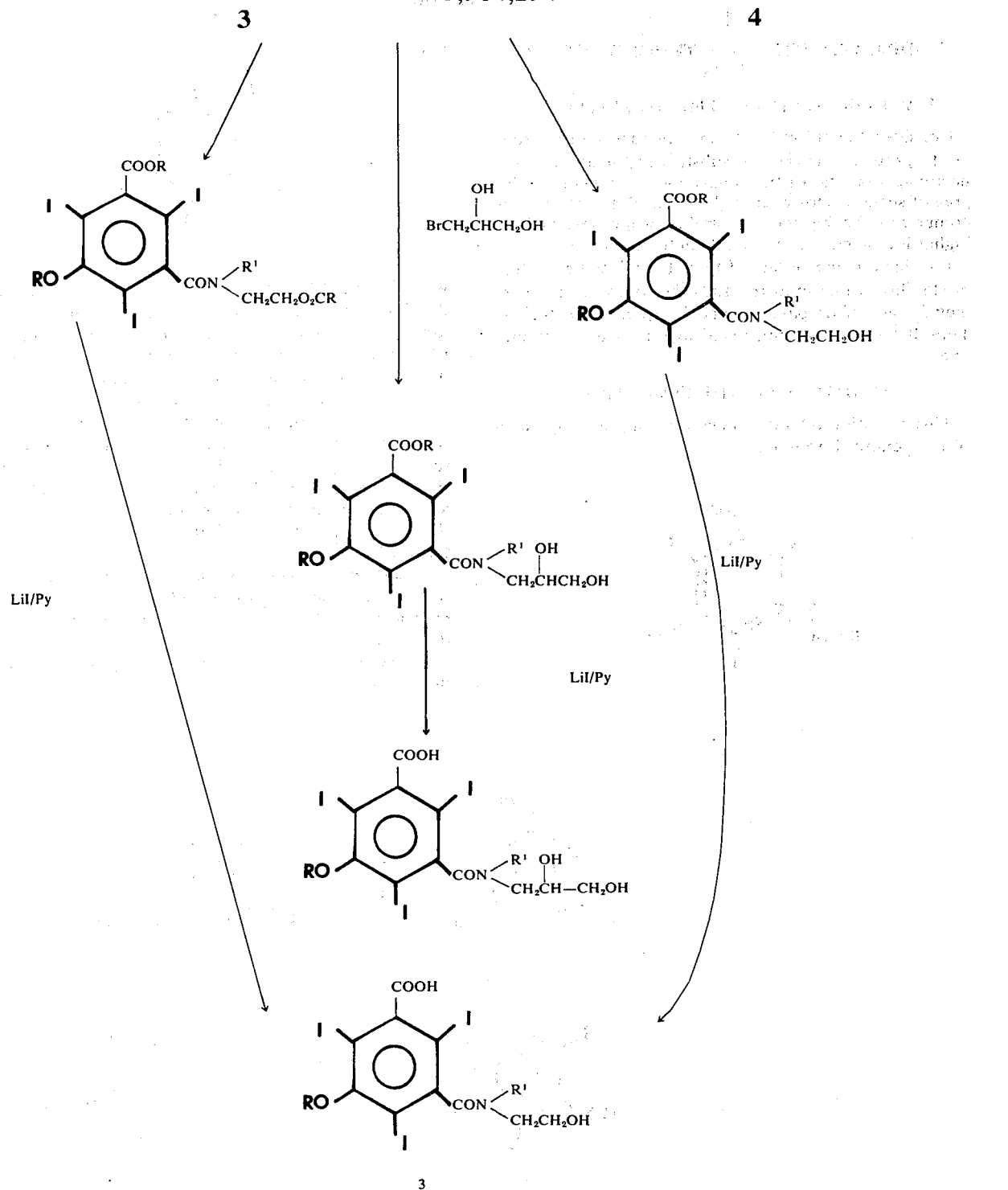
wherein R is alkyl, 2-hydroxyalkyl or 2,3-dihydroxyalkyl.
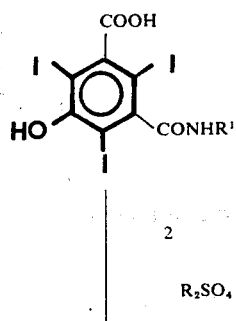

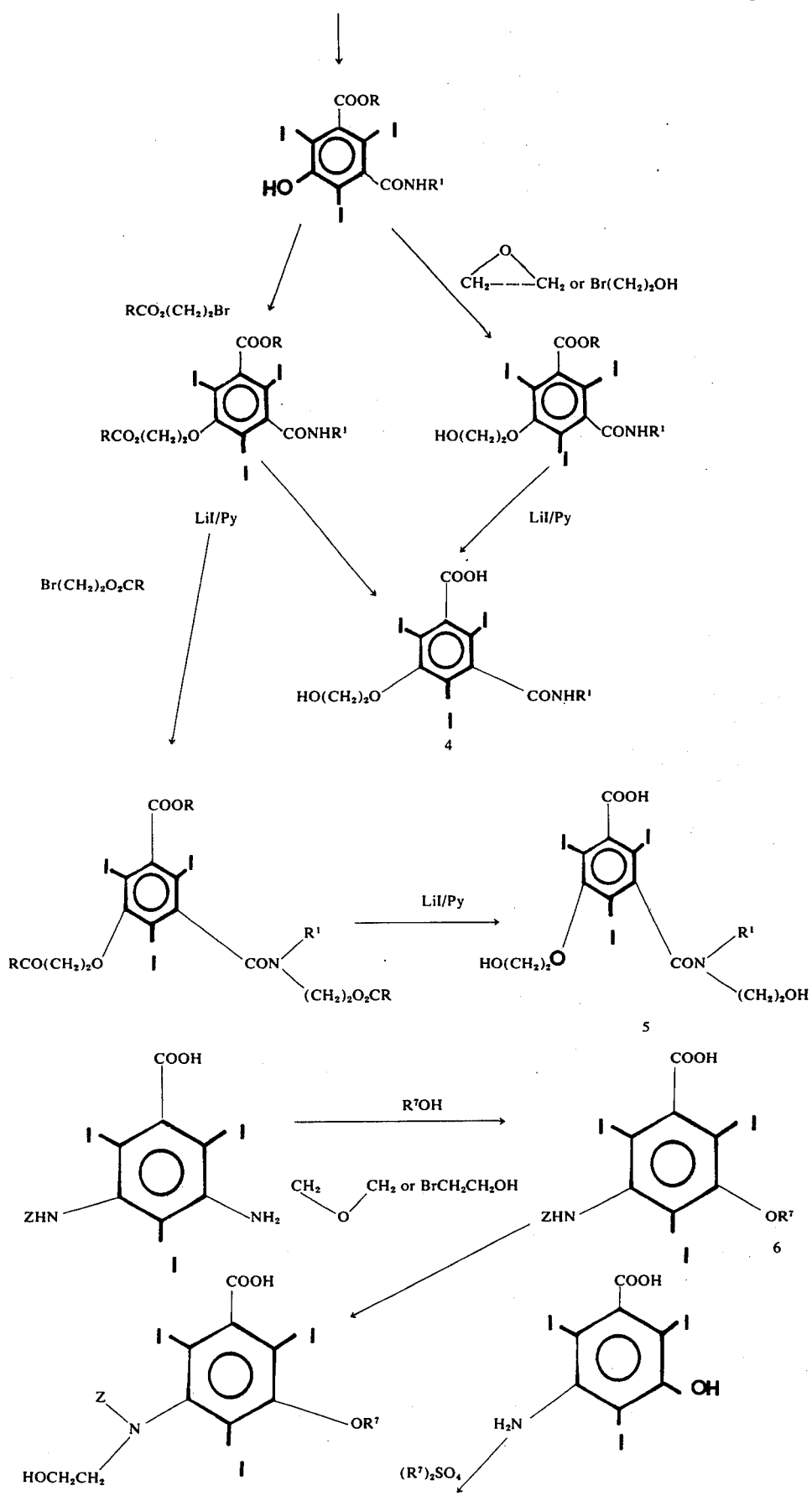

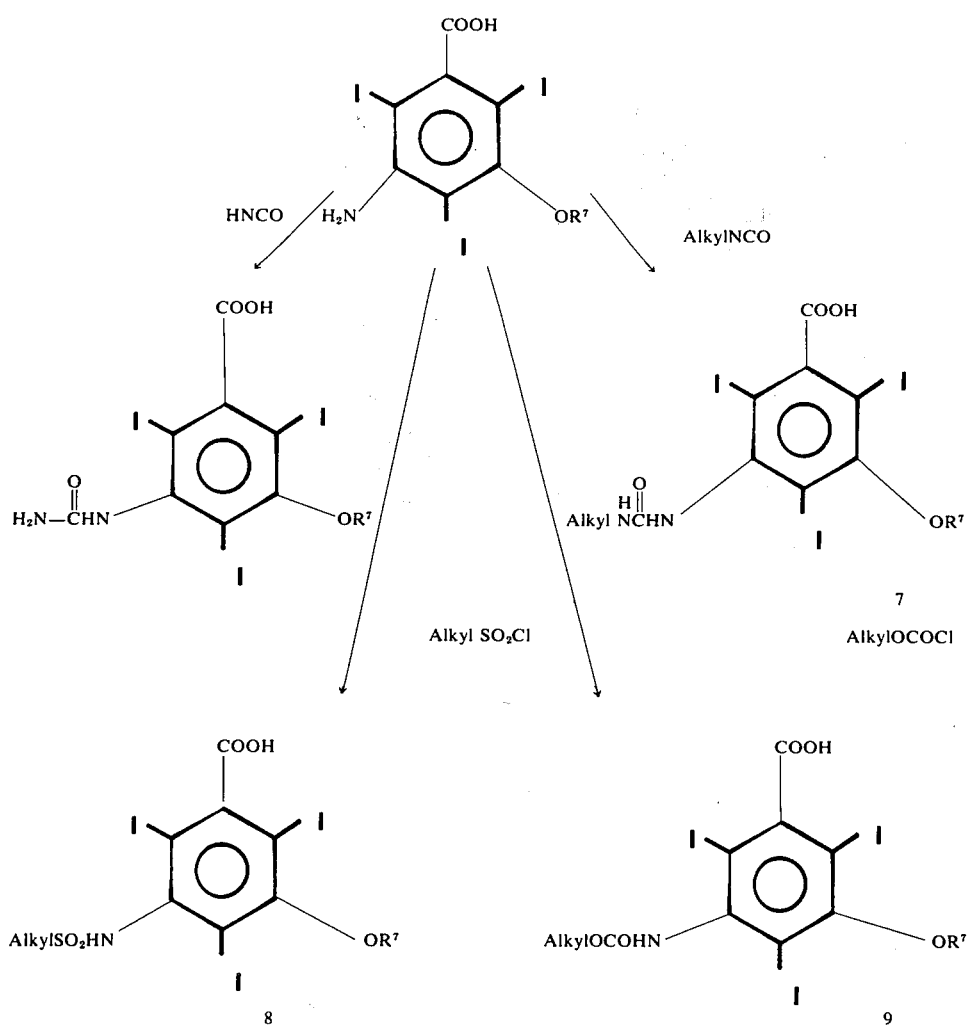

wherein Z is acyl or alkylsulfonyl.

The pharmaceutically acceptable salts of the amino group may be prepared by reacting the amine with an acid such as hydrochloric acid, sulfuric acid, phosphoric acid, tartaric acid or citric acid to form the corresponding hydrochloride, sulfate, phosphate, tartrate or citrate.

When $R^4$ is hydrogen the useful pharmaceutically acceptable salts may be prepared by reacting the acid with a base such as sodium hydroxide, potassium hydroxide, calcium hydroxide, ammonia, methylglucamine, and diethanolamine.

The term alkyl is intended to mean a branched or straight chain hydrocarbon fragment having 1 to 6 carbon atoms.

The term alkoxy is intended to mean a branched or straight chain hydrocarbon fragment having 1 to 6 carbon atoms linked to oxygen.

The term acyl is intended to mean a branched or straight chain hydrocarbon fragment having 1 to 6 carbon atoms linked to a carbonyl group.

As shown in the reaction schemes, the compounds of formula I may be prepared in the following manner. A 3-hydroxy-5-carboxybenzamide, which is the reaction product of a 3-amino-5-carboxybenzamide and $HNO_2$ followed by hydrolysis, is iodinated in the 2,4, and 6 positions utilizing $KICl_2$. The iodinated benzamide is then alkylated via a dialkylsulfate, such as dimethyl sulfate, diethyl sulfate, diisopropyl sulfate, etc. to give any one of a number of compounds depending upon the reaction conditions chosen. Thus the phenolic group and the carboxylic group may be alkylated, the phenolic group alone may be alkylated or only the carboxylic group may be alkylated.

Where both groups have been alkylated, the products may be reacted with oxides, such as ethylene oxide, alkyl halides, such as methyl iodide, ethyl bromide, isopropyl chloride, acetoxyethylbromide, 2-hydroxyethylbromide and 2,3-dihydroxypropylbromide. If the free acid is desired of the tertiary amides, that is the compounds corresponding to the compound wherein only the phenolic group is alkylated, one may hydrolyze the ester function, preferably by employing lithium iodide in pyridine.

Where only the carboxylic group is alkylated by the dialkyl sulfate, the phenolic group is capable of reacting with compounds such as ethylene oxide, acetoxyethylbromide, 2-hydroxyethylbromide, 2,3-dihydroxypropylbromide, alkyl halides, etc. to give ethers. The esters in turn may either be hydrolyzed to give the corresponding carboxylic acid, preferably utilizing lithium chloride or lithium iodide in pyridine, or again reacted with ethylene oxide, acetoxyethylbromide, 2-hydroxyethylbromide, 2,3-dihydroxyethylbromide or an alkyl halide. This second reaction converts the secondary amide into a tertiary amide, the ester group of which then may be hydrolyzed to the free acid, preferably by lithium chloride or iodide in pyridine.

Compounds of formula II may be prepared by replacing the amino group of 2,4,6-triiodo-3-secondary amido-5-aminobenzoic acid with an alkoxy group, such as methoxy, ethoxy, and isopropoxy by utilizing sodium nitrite and the desired alcohol. The formed ether may then be reacted with an alkyl halide, ethylene oxide, 2-hydroxyethylbromide or 2,3-dihydroxypropylbromide to yield the tertiary amide.

In addition compounds of formula II may be prepared from 3-hydroxy-5-amino-2,4,6-triiodobenzoic acid. The 3-hydroxy compound is converted to the ether by interaction with a dialkyl sulfate. The ethers so formed may in turn be reacted with acyl halides, sulfonyl halides, isocyanates and alkylchloroformates to give the respective acylamides, sulfonamides, ureas and carbamates.

The new products of formula I and II are useful as radiopaque agents for visualization of animal systems or organs, preferably in the form of physiologically acceptable salts such as sodium or methylglucamine salts for the preparation of solutions for intravascular injection for urography and for vasographic techniques such as angiocardiography, arteriography, nephrography and venography. The water-insoluble forms are useful in visualizing hollow organs and cavities having external orifices through which the contrast preparation can be introduced in preparation for the examination and removed therefrom after the examination is completed. Solutions having about 10 to 50% bound iodine, preferably about 25–37% may be used.

The following examples illustrate the present invention without, however, limiting the same thereto. All temperatures are on the Centigrade scale.

EXAMPLE 1

5-Hydroxy-2,4,6-triiodo-N-methylisophthalamic acid a. 5-Hydroxy-N-methylisophthalamic acid — To a stirred ice-cooled suspension of 70.0 g (0.36 mole) of 5-amino-N-methylisophthalamic acid in 100 ml of water is added 175 ml of a solution prepared by diluting 57 ml (1.08 mole) of concentrated sulfuric acid with water. The mixture is then treated at 0°–5° with a solution of 27.6 g (0.4 mole) of sodium nitrite in 50 ml of water during 20 minutes. After stirring for an additional 15 minutes, the slurry of the diazonium salt is gradually added to 500 ml of boiling water and the mixture heated under reflux for 15 minutes. After cooling, the product is filtered and dried, yield 53.6 g (76%), mp about 242°–243°d.

b. 5-Hydroxy-N-methyl-2,4,6-triiodoisophthalamic acid — A stirred suspension of 53.6 g (0.275 mole) of 5-hydroxy-N-methylisophthalamic acid in 500 ml of water is treated during 1 hour with 246 ml (0.55 mole) of 2.24 N potassium iododichloride solution. After stirring for 2 hours, 275 ml of 2 N aqueous sodium hydroxide is added during 1 hour, stirring continued 1 hour, and an additional 150 ml (0.33 mole) of potassium iododichloride solution added. The reaction mixture is then stirred for 18 hours, cooled, the product filtered, washed with water, extracted with hexane, and re- precipitated from an ammoniacal solution with dilute hydrochloric acid. The yield of colorless product is 124.3 g (88%), mp about 245°–246°d.

EXAMPLE 2

2,4,6-Triiodo-5-methoxy-N-methylisophthalamic acid

Procedure A a. 2,4,6-Triiodo-5-methoxy-N-methylisophthalamic acid — To a stirred solution of 52.8 g (0.092 mole) of 5-hydroxy-2,4,6-triiodo-N-methylisophthalamic acid in 230 ml (0.23 mole) of N aqueous sodium hydroxide is added dropwise during 25 minutes 13.93 g (0.11 mole) of dimethyl sulfate. The reaction mixture is then stirred for 1 hour, warmed to 50° and stirred for an additional 1 hour period. The pH is adjusted until strongly alkaline (pH 10–12), and the reaction mixture cooled in ice. Filtration of the solid gives 4.3 g (7% yield) of 2,4,6-triiodo-5-methoxy-N-methylisophthalamic acid methyl ester. The pH of the filtrate is then adjusted to about 4 by the addition of 20% hydrochloric acid and the colorless precipitate filtered and dried in vacuo. The dried mixture of the ester, the ether, and starting material is then extracted 3 times with 100 ml portions of boiling acetonitrile. The residue of crude product (16.3 g, mp 278°–280°d) is washed with water, redried in vacuo, and then recrystallized 3 times from methanol to afford 9.8 g (17% yield) of the pure substance, mp about 296°–298°d.

Procedure B a. 2,4,6-Triiodo-5-methoxy-N-methylisophthalamic acid methyl ester — To a stirred solution of 88.1 g (0.154 mole) of 5-hydroxy-2,4,6-triiodo-N-methylisophthalamic acid in 500 ml of absolute methanol is added a solution of 24.4 g (0.37 mole) of potassium hydroxide in 250 ml of methanol followed by 46.6 g (0.37 mole) of dimethyl sulfate during 1 hour. After stirring overnight, the mixture is concentrated to dryness, the residue stirred in 500 ml of an aqueous solution containing 20.2 g (0.154 mole) of potassium carbonate, filtered, washed with water, and dried. Extraction of this material with 250 ml of boiling methanol then affords 44.6 g (48% yield) of the pure product, mp about 270°–272°d.

b. 2,4,6-Triiodo-5-methoxy-N-methylisophthalamic acid—A stirred mixture of 3.0 g (0.005 mole) of the above ether-ester, 4.45 g (0.033 mole) of anhydrous lithium iodide, and 25 ml of dry pyridine is heated under reflux for 1 hour. The pyridine is then mostly removed by distillation in vacuo and the residue stirred in about 100 ml of crushed ice containing 10 ml of concentrated hydrochloric acid. After the ice melts, the mixture is extracted with three 50 ml portions of ethyl acetate and the extracts combined, dried over anhydrous magnesium sulfate, concentrated and the residue washed with 10 ml of hot acetonitrile to give 1.1 g (39% yield) of crude product, mp about 288°–289°d. The material is recrystallized from methanol to afford product of mp and mmp with that by procedure A of 296°–298°d. The products obtained by the two procedures were also identical when their infrared and nmr spectra were compared.

EXAMPLE 3

2,4,6-Triiodo-5-methoxy-N-2-hydroxyethyl-N-methylisophthalamic acid

Procedure A a. 2,4,6-Triiodo-5-methoxy-N-(2-acetoxyethyl)-N-methylisophthalamic acid methyl ester — A stirred mixture of 30.0 g (0.05 mole) of 2,4,6-triiodo-5-methoxy-N-methylisophthalamic acid methyl ester, 2.9 g (0.055 mole) of sodium methoxide, and 10.0 g (0.06 mole) of 2-bromoethyl acetate in 500 ml of absolute methanol is heated under reflux for 5 hours. The reaction mixture is then concentrated to dryness and the residue taken up in 500 ml of ethyl acetate, washed with water, dried (magnesium sulfate) and reconcentrated to give the desired product after recrystallization from acetonitrile.

b. 2,4,6-Triiodo-5-methoxy-N-(2-hydroxyethyl)-N-methylisophthalamic acid — A stirred mixture of 20.6 g (0.03 mole) of the acetoxy derivative from Example 3a, 24.0 g (0.18 mole) of lithium iodide, and 12.5 ml of dry pyridine is heated under gentle reflux for 50 minutes and the reaction mixture treated in a manner similar to that in section b of Example 2 to afford the desired product.

Procedure B a. 2,4,6-Triiodo-5-methoxy-N-(2-hydroxyethyl)-N-methylisophthalamic acid methyl ester — By replacing the 2-bromoethyl acetate in Procedure A, section (a) with 7.5 g (0.06 mole) of ethylene bromohydrin and proceeding in a similar manner to that described in section (a) of Procedure A there is obtained the desired product.

b. 2,4,6-Triiodo-5-methoxy-N-(2-hydroxyethyl)-N-methylisophthalamic acid — By substituting 3.8 g (0.005 mole) of the above product from section (a) for the 2,4,6-triiodo-5-methoxy-N-methylisophthalamic acid methyl ester in section (b) of Procedure B in Example 2 there is obtained the desired product.

Procedure C a. 2,4,6-Triiodo-5-methoxy-N-(2-hydroxyethyl)-N-methylisophthalamic acid methyl ester — To a solution of 18.0 g (0.03 mole) of 2,4,6-triiodo-3-methoxy-N-methyl-isophthalamic acid methyl ester in 1 liter of ethanol is added 1.46 g (0.033 mole) of ethylene oxide and 10 ml of N sodium ethoxide solution. The mixture is then heated at 60°–70° in an autoclave for 18 hours, the solvent removed by distillation under reduced pressure, and the residue taken up in 500 ml of ethyl acetate, washed with 100 ml of 10% hydrochloric acid, then with water, dried over magnesium sulfate, filtered, and concentrated to dryness to yield the desired product.

b. 2,4,6-Triiodo-5-methoxy-N-(2-hydroxyethyl)-N-methylisophthalamic acid — By substituting 3.8 g (0.005 mole) of the above product from section (a) for the 2,4,6-triiodo-5-methoxy-N-methylisophthalamic acid methyl ester in section (b) of Procedure B in Example 2 there is obtained the desired product.

EXAMPLE 4

5-(2-Hydroxyethoxy)-2,4,6-triiodo-N-methylisophthalamic acid a. 5-Hydroxy-2,4,6-triiodo-N-methylisophthalamic acid methyl ester — To a stirred solution of 50.5 g (0.088 mole) of 5-hydroxy-2,4,6-triiodo-N-methylisophthalamic acid in 1.5 liters of dry acetone is added 9.26 g (0.11 mole) of sodium bicarbonate, the mixture stirred 0.5 hour, and then treated with 13.89 (0.11 mole) of dimethyl sulfate during 1 hour. After heating under reflux for 8 hours, the reaction mixture is concentrated to dryness. The residue is then washed with water and extracted with 176 ml (0.088 mole) of 0.05 N aqueous sodium hydroxide, filtered from 9.1 g of the ester-ether, mp about 269°–270°d, and the filtrate acidified. The separated product is filtered, dried, extracted with 1 liter of acetone, and the acetone extract decolorized, filtered, and concentrated to give 39.8 g (76%) of pure ester, mp about 215°–216°.

b. 5-(2-Acetoxyethoxy)-2,4,6-triiodo-N-methylisophthalamic acid methyl ester — A stirred mixture of 29.4 g (0.05 mole) of the above ester, 10.0 g (0.06 mole) of 2-bromoethyl acetate, 8.3 g (0.06 mole) of potassium carbonate, 1.5 g of sodium iodide and 500 ml of ethyl methyl ketone is heated under reflux for 3 hours. The reaction mixture is filtered, concentrated to dryness, and the residual gum dissolved in benzene, washed with water, and reconcentrated to dryness to give the desired product.

c. 5-(2-Hydroxyethoxy)-2,4,6-triiodo-N-methylisophthalamic acid — Substituting for the 2,4,6-triiodo-5-methoxy-N-methylisophthalamic acid methyl ester in section (b) of Example 2, 3.4 g of 5-(2-acetoxyethoxy)-2,4,6-triiodo-N-methylisophthalamic acid methyl ester and proceeding as before gives the desired product.

Procedure B a. 5-(2-Hydroxyethoxy)-2,4,6-triiodo-N-methylisophthalamic acid methyl ester — By substituting 7.5 g (0.06 mole) of ethylene bromohydrin for the 2-bromoethyl acetate in section (b) of Procedure A there is obtained the desired product.

b. 5-(2-Hydroxyethoxy)-2,4,6-triiodo-N-methylisophthalamic acid — By replacing the 2,4,6-triiodo-5-methoxy-N-methylisophthalamic acid methyl ester in section (b) of Procedure B in Example 2 with 3.2 g of the product obtained in section (a) there is obtained the desired product.

Procedure C a. 5-(2-Hydroxyethoxy)-2,4,6-triiodo-N-methylisophthalamic acid methyl ester — By substituting 17.7 g of 5-hydroxy-2,4,6-triiodo-N-methylisophthalamic acid methyl ester for the 2,4,6-triiodo-3-methoxy-N-methylisophthalamic acid in section (a) of Procedure C in Example 3 there is obtained the desired product.

b. 5-(2-Hydroxyethoxy)-2,4,6-triiodo-N-methylisophthalamic acid — By substituting 3.18 g of the above 5-(2-hydroxyethoxy)-2,4,6-triiodo-N-methylisophthalamic acid methyl ester for the 2,4,6-triiodo-5-methoxy-N-methylisophthalamic acid methyl ester in section (b) of Procedure B in Example 2 there is obtained the desired product.

EXAMPLE 5

5-(2-Hydroxyethoxy)-2,4,6-triiodo-N-2-hydroxyethyl-N-methylisophthalamic acid a. 5-(2-Acetoxyethoxy)-2,4,6-triiodo-N-(2-acetoxyethyl)-N-methylisophthalamic acid methyl ester — By replacing the 2,4,6-triiodo-5-methoxy-N- methylisophthalamic acid methyl ester in Procedure A section (a) of Example 3 with 33.6 g of 5-(2-acetoxyethoxy)-2,4,6-triiodo-N-methylisophthalamic acid methyl ester there is obtained the desired product.

b. 5-(2-Hydroxyethoxy)-2,4,6-triiodo-N-2-hydroxyethyl-N-methylisophthalamic acid — By substituting 3.66 g of the 5-(2-acetoxyethoxy)-2,4,6-triiodo-N-(2-acetoxyethyl)-N-methylisophthalamic acid methyl ester from the preceeding section for the 2,4,6-triiodo-5-methoxy-N-methylisophthalamic acid methyl ester in Example 2, section (b) and proceeding as before there is obtained the desired product.

EXAMPLE 6

3-Acetamido-2,4,6-triiodo-5-methoxybenzoic acid

To a stirred suspension of 27.9 g (0.05 mole) of 3-acetamido-2,4,6-triiodo-5-amino benzoic acid in 150 ml of acetic acid cooled in ice is added 25 ml of sulfuric acid at such a rate that the temperature is maintained at 10°–15°. The mixture is then cooled to 0° and treated dropwise with a solution of 4.15 g (0.06 mole) of sodium nitrite in 10 ml of water. After stirring for an additional 0.5 hour the solution is filtered through a cooled sintered glass funnel, added to 1 liter of cooled (10°) absolute methanol, and heated under reflux for 0.5 hour. The solution is then filtered, concentrated to dryness, the residue washed with water, dried, and recrystallized from acetonitrile to yield 22.0 g (75%) of pale buff product, mp about 254°–255°d.

EXAMPLE 7

3-Acetamido-5-ethoxy-2,4,6-triiodobenzoic acid

By substituting ethanol for the methanol in Example 6 and proceeding in a similar manner there is obtained 3-acetamido-5-ethoxy-2,4,6-triiodobenzoic acid.

EXAMPLE 8

3-Acetamido-2,4,6-triiodo-5-isopropoxybenzoic acid

By substituting isopropanol for the methanol in Example 6 and proceeding according to the method described in Example 6 there is obtained 3-acetamido-2,4,6-triiodo-5-isopropoxybenzoic acid.

EXAMPLE 9

2,4,6-Triiodo-3-methoxy-5-(3-methylureido)benzoic acid a. 3-Amino-2,4,6-triiodo-5-methoxy benzoic acid — To a stirred solution of 53.0 g (0.10 mole) of 3-amino-5-hydroxy-2,4,6-triiodobenzoic acid in 200 ml of N aqueous sodium hydroxide is added at 10°–15° 13.93 g (0.11 mole) of dimethylsulfate during 25 minutes. The cooling bath is removed and the mixture is then cooled in ice, the pH adjusted to about 9, and about 4.7 g of insoluble material filtered. The pH of the filtrate is then adjusted to about 5 and the colorless crude product filtered, washed with water, and dried. The material is purified by recrystallization from acetonitrile to yield the desired 3-amino-2,4,6-triiodo-5-methoxybenzoic acid.

b. 2,4,6-Triiodo-3-methoxy-5-(3-methylureido)benzoic acid — To a solution of 10.9 g (0.02 mole) of the above 3-amino-2,4,6-triiodo-5-methoxybenzoic acid in 250 ml of glyme is added while stirring vigorously a solution of 1.25 g (0.022 mole) of methylisocyanate in 25 ml of the same solvent. The reaction mixture is then heated under reflux for 3 hours, concentrated to dryness, the residue triturated in dilute hydrochloric acid, and the solid reprecipitated from a dilute ammoniacal solution, after treatment with charcoal and filtration, with 20% hydrochloric acid to afford the desired product.

EXAMPLE 10

2,4,6-Triiodo-3-methanesulfonamido-5-methoxybenzoic acid

By substituting 2.52 g (0.022 mole) of methanesulfonyl chloride for the methylisocyanate in section (b) of Example 9 and proceeding in the manner indicated there is obtained the desired 2,4,6-triiodo-3-methanesulfonamido-5-methoxybenzoic acid.

EXAMPLE 11

3-Ethoxycarbonylamino-2,4,6-triiodo-5-methoxybenzoic acid

A stirred mixture of 10.9 g (0.02 mole) of 3-amino-2,4,6-triiodo-5-methoxybenzoic acid, 2.3 g (0.022 mole) of sodium carbonate, 2.4 g (0.022 mole) of ethyl chloroformate, and 250 ml of ethyl methyl ketone is heated under reflux for 18 hours. The reaction mixture is then filtered, concentrated to dryness, the residue triturated in dilute hydrochloric acid, and reprecipitated from a dilute ammoniacal solution to yield the desired product.

EXAMPLE 12

Sodium 3-acetamido-2,4,6-triiodo-5-methoxybenzoate

To a suspension of 5.86 grams of 3-acetamido-2,4,6-triiodo-5-methoxybenzoic acid in 50 ml of water there is added slowly, with vigorous stirring, 10 ml of 1.0N sodium hydroxide solution. The solid slowly dissolves. The solution is filtered and lyophilized to yield the desired sodium 3-acetamido-2,4,6-triiodo-5-methoxybenzoate.

EXAMPLE 13

A solution suitable for intravenous urography has the following composition:

| | |
|---|---|
| Sodium 3-acetamido-2,4,6-triiodo-5-methoxybenzoate | 60 gm |
| Sodium citrate (as buffer) | 320 mgm |
| Disodium ethylenediamine tetraacetic acid dihydrate (as sequestering agent) | 40 mgm |
| Methyl paraben (as preservative | 100 mgm |
| Propyl paraben (as preservative) | 30 mgm |
| q. s. to 100 ml | |

The solution as prepared by dissolving the sodium salt in a limited amount of sterile water, adjusting the pH to about 7, adding the rest of the components and adjusting the final volume to 100 ml.

EXAMPLE 14

An emulsion suitable for use in visualizing hollow organs and cavities having external orifices has the following composition:

| | |
|---|---|
| Methyl 5-(2-hydroxyethoxy)-2,4,6-triiodo-N-methylisophthalamate | 40 gm |
| Polyoxyethylenesorbitan monooleate ("Tween" 80) | 2.8 gm |
| Sorbitan monooleate ("Span" 80) | 2.2 gm |
| Purified lecithin | 0.4 gm |
| Decyl oleate | 3.0 gm |
| Distilled water — q.s. to | 100 ml |

The "Tween" 80, "Span" 80, lecithin and decyl oleate are heated on a steam bath until the lecithin is dissolved. The micronized methyl 5-2-(hydroxyetheroxy)2,4,6-triiodo-N-methylisophthamate is then added at 75° and 60 ml of water (78°) also added. The mixture is stirred in a high speed mixer for several 3-minutes periods with 1 minute intervals and finally homogenized at 3,000 lbs./sq. in. for 2 periods of 5 minutes.

What is claimed is:

1. A compound of the formula:

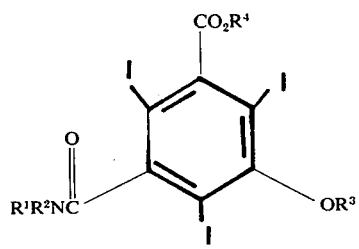

wherein $R^1$ to $R^3$ are selected from the group consisting of hydrogen, alkyl of 1 to 6 carbon atoms, 2-hydroxyalkyl of 2 to 6 carbon atoms and 2,3-dihydroxyalkyl of 3 to 6 carbon atoms and $R^4$ is selected from the group consisting of hydrogen, alkyl of 1 to 6 carbon atoms, 2-hydroxyalkyl of 2 to 6 carbon atoms, 2,3-dihydroxyalkyl of 3 to 6 carbon atoms and when $R^4$ is hydrogen the pharmaceutically acceptable salts thereof.

2. The compounds of claim 1 wherein $R^1$ is hydrogen, $R^3$ is selected from the group consisting of alkyl of 1 to 6 carbon atoms, 2-hydroxyalkyl of 2 to 6 carbon atoms and 2,3-dihydroxyalkyl of 3 to 6 carbon atoms and $R^4$ is selected from the group consisting of hydrogen and pharmaceutically acceptable salts.

3. The compound of claim 2 having the name 2,4,6-triiodo-5-methoxy-N-methylisophthalamic acid.

* * * * *

UNITED STATES PATENT AND TRADEMARK OFFICE
CERTIFICATE OF CORRECTION

PATENT NO. : 3,914,294
DATED : 10/21/75
INVENTOR(S) : Bernstein et al.

It is certified that error appears in the above-identified patent and that said Letter Patent are hereby corrected as shown below:

Col. 14, line 48, "(as preservative" should read
--(as preservative)--.

Col. 16, line 8, --and-- should be inserted after "hydrogen".

Signed and Sealed this twenty-third Day of March 1976

[SEAL]

Attest:

RUTH C. MASON
Attesting Officer

C. MARSHALL DANN
Commissioner of Patents and Trademarks